United States Patent
Tarao et al.

(10) Patent No.: US 9,474,941 B2
(45) Date of Patent: Oct. 25, 2016

(54) GOLF BALL MATERIAL AND GOLF BALL USING THE SAME

(71) Applicant: DUNLOP SPORTS CO., LTD., Kobe-shi, Hyogo (JP)

(72) Inventors: Toshiyuki Tarao, Kobe (JP); Kuniyasu Horiuchi, Kobe (JP)

(73) Assignee: DUNLOP SPORTS CO., LTD., Kobe-Shi (JP)

( * ) Notice: Subject to any disclaimer, the term of this patent is extended or adjusted under 35 U.S.C. 154(b) by 118 days.

(21) Appl. No.: 13/683,108

(22) Filed: Nov. 21, 2012

(65) Prior Publication Data

US 2013/0137535 A1 May 30, 2013

(30) Foreign Application Priority Data

Nov. 25, 2011 (JP) ................................. 2011-257977

(51) Int. Cl.
| | | |
|---|---|---|
| *A63B 37/00* | (2006.01) | |
| *C08F 293/00* | (2006.01) | |
| *A63B 45/00* | (2006.01) | |

(52) U.S. Cl.
CPC ....... *A63B 37/0039* (2013.01); *A63B 37/0003* (2013.01); *A63B 37/0077* (2013.01); *C08F 293/005* (2013.01); *A63B 37/0031* (2013.01); *A63B 37/0033* (2013.01); *A63B 37/0062* (2013.01); *A63B 37/0067* (2013.01); *A63B 37/0074* (2013.01); *A63B 37/0075* (2013.01); *A63B 45/00* (2013.01); *A63B 2037/0079* (2013.01); *C08F 2438/01* (2013.01)

(58) Field of Classification Search
CPC .......... A63B 37/0003; A63B 37/0031; A63B 37/0062; A63B 37/0039; A63B 37/0074; A63B 37/0075; C08F 293/00; C08F 293/005; C08F 297/026; C08F 297/08; C08L 23/0876; C08L 53/005
USPC .................. 525/242, 299, 319, 329.5, 330.6; 473/372, 373, 378
See application file for complete search history.

(56) References Cited

U.S. PATENT DOCUMENTS

| | | | |
|---|---|---|---|
| 6,120,392 A * | 9/2000 | Kashiwagi et al. | .......... 473/374 |
| 6,142,888 A | 11/2000 | Higuchi et al. | |
| 2003/0204022 A1* | 10/2003 | Kennedy et al. | ............. 525/242 |
| 2004/0106736 A1 | 6/2004 | Takesue et al. | |
| 2006/0025238 A1 | 2/2006 | Endo et al. | |
| 2006/0030674 A1* | 2/2006 | Sullivan | ..................... 525/329.5 |
| 2007/0100075 A1 | 5/2007 | Takesue | |
| 2009/0270203 A1 | 10/2009 | Okabe | |
| 2010/0137076 A1 | 6/2010 | Endo et al. | |

FOREIGN PATENT DOCUMENTS

| | | |
|---|---|---|
| JP | 11-253580 A | 9/1999 |
| JP | 2004-180725 A | 7/2004 |
| JP | 2006-034740 A | 2/2006 |
| JP | 2007-125377 A | 5/2007 |
| JP | 2009-161724 A | 7/2009 |
| JP | 2009-261791 A | 11/2009 |

OTHER PUBLICATIONS

Weiss, R.A. et al. Polymer vol. 32(10) pp. 1867-1874 published in 1991.*
Kuroki et al., "Determination of Chemical Structures by 1H—and 13C-NMR for Thermally Degraded Linear High Density Polyethylene", Journal of Polymer Science: Polymer Chemistry Edition, vol. 21, pp. 703-714, 1983.
Sawaguchi et al., "Preparation of α,ω-Diisopropenyloligopropylene by Thermal Degradation of Isotactic Polypropylene", Macromolecules, vol. 28, No. 24, pp. 7973-7978, Nov. 20, 1995.
English translation of Japanese Notice of Reasons for Rejection, dated Oct. 13, 2015, for Japanese Application No. 2011-257977.

* cited by examiner

*Primary Examiner* — Irina S Zemel
*Assistant Examiner* — Jeffrey Lenihan
(74) *Attorney, Agent, or Firm* — Birch, Stewart, Kolasch & Birch, LLP

(57) ABSTRACT

An object of the present invention is to provide a golf ball with improved durability and/or resilience by improving the adhesion between a constituent member comprising an ionomer resin and a constituent member comprising a polyurethane. The present invention provides a golf ball material composed of a multi-block copolymer having a block A that has an acid functional group neutralized with a metal ion and a block B that has lower polarity than the block A.

13 Claims, No Drawings

GOLF BALL MATERIAL AND GOLF BALL USING THE SAME

FIELD OF THE INVENTION

The present invention relates to a novel ionomer resin for use in a golf ball and a golf ball using the same.

DESCRIPTION OF THE RELATED ART

A golf ball having a core, an intermediate layer covering the core, and a cover covering the intermediate layer, wherein the intermediate layer is formed from an ionomer resin and the cover is formed from a polyurethane has been known. However, since the adhesion between an ionomer resin and a polyurethane is low, there is a problem that the durability and the resilience of an obtained golf ball are lowered. Techniques to improve the adhesion between a layer formed from an ionomer resin and a layer formed from a polyurethane are disclosed in Japanese Patent Publication Nos. 2006-34740 A and 2004-180725 A. Japanese Patent Publication No. 2006-34740 A discloses that a reinforcing layer is provided between a layer containing an ionomer resin and a layer containing a polyurethane for enhancing the adhesion between both layers. For the reinforcing layer, a two-component curing type thermosetting resin is used.

Japanese Patent Publication No. 2004-180725 A discloses a golf ball comprising a core and two or more cover layers covering the core, the first cover layer being adjacent to the second cover layer, wherein the first cover layer is formed primarily from (a) a non-ionomer thermoplastic elastomer and (b) a mixture of (b-1) an isocyanate compound and (b-2) a thermoplastic resin which does not substantially react with isocyanate; the second cover layer is formed primarily from a mixture composed of a resin component, (e) a fatty acid having a carbon number of 18-80 and/or a derivative thereof, (f) a metal ion source being capable of neutralizing unneutralized acid group in (c) component and (e) component, and (g) a compound having a molecular weight of 20,000 or less and having two or more reactive functional groups, wherein the resin component is obtained by blending (c) one or more base resins selected from (c-1) an olefin-unsaturated carboxylic acid binary random copolymer and a metal-ion neutralized product of an olefin-unsaturated carboxylic acid binary random copolymer and (c-2) an olefin-unsaturated carboxylic acid-unsaturated carboxylic ester ternary random copolymer and a metal-ion neutralized product of an olefin-unsaturated carboxylic acid-unsaturated carboxylic ester ternary random copolymer and (d) a non-ionomer thermoplastic elastomer in a weight ratio from 100:0 to 50:50,

SUMMARY OF THE INVENTION

Japanese Patent Publication No. 2006-34740 A discloses use of a thermosetting resin as an adhesive, but the durability of the obtained golf ball is not sufficient. According to the technique of Japanese Patent Publication No. 2004-180725 A, the isocyanate mixture (b) of the first cover layer and the compound (g) having two or more reactive functional groups and having a molecular weight of 20,000 or less of the second cover layer react with each other to enhance the adhesion. However, in the first cover layer, the isocyanate mixture (b) is dispersed in the thermoplastic polyurethane elastomer (a) which reacts with the isocyanate mixture, and thus it is difficult to make the isocyanate mixture (b) selectively react with the compound (g) having reactive functional groups. The present invention has been made in view of the above circumstances, and an object of the present invention is to improve the adhesion between a constituent member comprising an ionomer resin and a constituent member comprising a polyurethane in a golf ball. In addition, another object of the present invention is to provide a golf ball having improved durability and/or resilience as a result of improvement in the adhesion between a constituent member comprising an ionomer resin and a constituent member comprising a polyurethane.

The present invention that has solved the above problems provides a golf ball material composed of a multi-block copolymer having a block A that has an acid functional group neutralized with a metal ion and a block B that has lower polarity than the block A. The golf ball material of the present invention has the high-polarity block A and the block B whose polarity is lower than that of the block A, and thus has excellent adhesion to either of a high-polarity material and a low-polarity material.

The present invention further provides a golf ball comprising a constituent member containing an ionomer resin and a constituent member containing a polyurethane, wherein an adhesive layer containing the above golf ball material is interposed between the constituent member containing the ionomer resin and the constituent member containing the polyurethane.

The present invention further provides a golf ball comprising a constituent member containing the above golf ball material and a constituent member containing a polyurethane, the constituent member containing the golf ball material being adjacent to the constituent member containing the polyurethane.

According to the present invention, the adhesion between a constituent member containing an ionomer resin and a constituent member containing a polyurethane can be improved in a golf ball. As a result, a golf ball having excellent durability and/or resilience is obtained.

DESCRIPTION OF THE PREFERRED EMBODIMENT (1) Golf Ball Material

The present invention provides a golf ball material composed of a multi-block copolymer having a block A that has an acid functional group neutralized with a metal ion and a block B that has lower polarity than the block A. First, the multi-block copolymer will be described. The multi-block copolymer has the high-polarity block A and the low-polarity block B, and thus has excellent adhesion to either of a high-polarity material and a low-polarity material.

The term "polarity" means that as a result of atoms having different electronegativities being bonded to each other, the electron density in the bond is biased, the low-electronegativity atom becomes positively charged, the high-electronegativity atom becomes negatively charged, and thus the molecule or the bond constitutes a dipole. The degree of the polarity can be compared, for example, on the basis of the dipole moment of a molecular structure.

The multi-block copolymer preferably has an A-B-A type tri-block copolymer structure, and is more preferably an A-B-A type tri-block copolymer. The block A has an acid functional group, and at least a part of the acid functional group thereof is neutralized with a metal ion. Thus, the block A has high polarity.

The block B is not particularly limited, as long as the polarity of the block B is lower than that of the block A. Examples of the block B include a block having a functional group having lower polarity than the block A, a block having a low amount of the polar functional group than the block A, and a block having no polar functional group. As the block B, for example, a polyolefin block, which is generally known as a non-polarity material, is preferred. In the polyolefin structure, no high-electronegativity atoms are present, and thus the polarity is low. As the polyolefin block, the polyolefin block containing an olefin having 2 to 8 carbon atoms as a component, namely, as a repeat unit, is preferred. Examples of the olefin having 2 to 8 carbon atoms includes ethylene, propylene, butene, pentene, hexene, heptene, and octene.

As the polyolefin block, the polyolefin block containing, as a component, at least one olefin selected from the group consisting of ethylene, propylene, butene, and pentene is preferred. As the polyolefin block, for example, a block having a structure represented by the following formula (1) is preferred.

(1)

(wherein $R^1$ is selected from the group consisting of H, $CH_3$, $C_2H_5$, $CH_2CH(CH_3)_2$)

In the formula (1), the number n of repeat units is not particularly limited, and is an integer of 10 to 1000. Specific examples of the polyolefin block represented by the formula (1) include a polyethylene block (all $R^1$ is H), a polypropylene block (all $R^1$ is $CH_3$), a poly(1-butene) (all $R^1$ is $C_2H_5$), an ethylene-propylene copolymer ($R^1$ is H and $CH_3$), an ethylene-1-butene copolymer ($R^1$ is H and $C_2H_5$), a propylene-1-butene copolymer ($R^1$ is $CH_3$ and $C_2H_5$), and a poly(4-methyl-1-pentene) block (all $R^1$ is $CH_2CH(CH_3)_2$). Each of the above copolymers may be either a random copolymer or a block copolymer.

The block A is not particularly limited, as long as the block A has an acid functional group and at least a part of the acid functional group thereof is neutralized with a metal ion. Since the block A has an acid functional group and at least a part of the acid functional group thereof is neutralized with a metal ion, the block A has high polarity. Examples of the acid functional group are a carboxyl group, a sulfonic acid group, and a sulfuric acid group, and a carboxyl group is preferred. Examples of the metal ion that neutralizes the acid functional group include monovalent metal ions of sodium, potassium, lithium, and the like; divalent metal ions of magnesium, calcium, zinc, barium, cadmium, and the like; trivalent metal ions of aluminum and the like; and other ions of tin, zirconium, and the like.

As the block A, a block which contains, as a component, an α,β-unsaturated carboxylic acid having 3 to 8 carbon atoms and/or an ester thereof and in which at least a part of the carboxyl groups is neutralized with a metal ion, is preferable. Examples of the α,β-unsaturated carboxylic acid having 3 to 8 carbon atoms include acrylic acid, methacrylic acid, fumaric acid, maleic acid, and crotonic acid, and acrylic acid or methacrylic acid is particularly preferred. In addition, as the ester of the α,β-unsaturated carboxylic acid having 3 to 8 carbon atoms, a methyl, ethyl, propyl, n-butyl, or isobutyl ester of acrylic acid, methacrylic acid, fumaric acid, maleic acid, crotonic acid, or the like, is preferably used, and an acrylic acid ester or a methacrylic acid ester is particularly preferred.

The degree of neutralization (mole %) of the acid functional group of the block A is not particularly limited, but is preferably 10 mole % or more, and more preferably 15 mole % or more, and is preferably 100 mole % or less and more preferably 95 mole % or less. The degree of neutralization (mole %) of the acid functional group of the block A can be determined by the following equation. If the degree of neutralization falls within the above range, the ion cross-linking proceeds and the resilience is enhanced.

Degree of neutralization (mole %) of the acid functional group of block A=100×mole number of the neutralized acid functional group in block A/total mole number of the carboxyl group in block A Next, a method of producing the multi-block copolymer will be described. The multi-block copolymer having the A-B-A type tri-block copolymer structure is produced by conducting atom transfer radical polymerization (ATPR) with a both terminal halogenated olefin oligomer where halogens are introduced at both terminals thereof as a macro initiator, using an ethylenically unsaturated monomer.

The method of producing the multi-block copolymer having the A-B-A type tri-block copolymer structure is described in detail, for example, in Japanese Patent Publication No. 2009-161724 A, and the outline thereof is as follows. The both terminal halogenated olefin oligomer can be synthesized by conducting an esterification reaction of a both terminal hydroxylated olefin oligomer with an α-halo acyl halide. The both terminal hydroxylated olefin oligomer is obtained by hydroboration of a double bond of an olefin oligomer having vinylidene bonds at both terminals, followed by oxidation. The olefin oligomer having vinylidene bonds at both terminals is obtained as a pyrolytic product of a polyolefin by highly-controlled pyrolysis (see Macromolecules, 28, 7973 (1995)).

Giving a description with polypropylene as an example, a pyrolytic product of polypropylene obtained by a highly-controlled pyrolysis method has a number average molecular weight Mn of about 1,000 to 50,000, a dispersity Mw/Mn of about 2, and an average number of vinylidene groups of about 1.5 to 1.8 per one molecule, and also has a property of maintaining stereoregularity of polypropylene which is the raw material before decomposition. The weight average molecular weight of polypropylene which is the raw material before decomposition preferably falls within a range from 10,000 to 1,000,000 and more preferably within a range from 200,000 to 80,0000.

As a pyrolysis device, a device disclosed in Journal of Polymer Science: Polymer Chemistry Edition, 21, 703 (1983) can be used. Polypropylene is put into a reaction vessel of the pyrolysis device which is made of Pyrex (registered trademark) glass, and a pyrolysis reaction is conducted at a predetermined temperature for a predetermined time period while suppressing a secondary reaction by severely bubbling the melting polymer phase with nitrogen gas under reduced pressure to remove the volatile product. After the end of the pyrolysis reaction, the remaining product in the reaction vessel is dissolved in hot xylene, and filtered while it is hot, and then reprecipitated with an alcohol for purification. The reprecipitated product is collected by filtering, and vacuum-dried to obtain a propylene oligomer containing vinylidene bonds at both terminals.

The pyrolysis conditions are adjusted by predicting the molecular weight of the product from the molecular weight of polypropylene before the decomposition and the primary structure of the block copolymer of the final target product and taking the result of a previously conducted experiment into consideration. The temperature for the pyrolysis is preferably in the range of 300° C. to 450° C. At a temperature lower than 300° C., there is the possibility that the pyrolysis reaction of polypropylene does not proceed sufficiently, and at a temperature higher than 450° C., there is the possibility that degradation of the pyrolytic product proceeds.

Hydroxylation is achieved by hydroboration and a subsequent oxidation reaction of the double bond of the propylene oligomer containing vinylidene bonds at both terminals obtained according to the above method. For example, tetrahydrofuran is used as a solvent, and a boronating agent is added to conduct hydroboration. As the boronating agent, 9-borane bicyclononane or a borane-tetrahydrofuran complex can be used. To the reaction solution after the hydroboration, a hydrogen peroxide solution is added to conduct an oxidation reaction, thereby providing an olefin oligomer containing hydroxyl groups at both terminals.

As the olefin oligomer containing hydroxyl groups at both terminals, a commercial product may be preferably used. Specific examples thereof include Polytail H manufactured by Mitsubishi Chemical Corporation (both terminal hydroxylated ethylene-1-butene copolymer, number average molecular weight: 2,800, OH value: 45 mg KOH/g), Epole manufactured by Idemitsu Kosan Co., Ltd. (a hydrogenated polyisoprene diol, number average molecular weight: 2,500, OH value: 40 mg KOH/g), and GI2000 manufactured by Nippon Soda Co., Ltd. (a hydrogenated polybutadiene polyol, number average molecular weight: 2,000, OH value: 46 mg KOH/g). In the present invention, Polytail H manufactured by Mitsubishi Chemical Corporation (both terminal hydroxylated ethylene-1-butene copolymer) is preferably used.

Subsequently, the obtained olefin oligomer containing hydroxyl groups at both terminals is subject to the esterification reaction with an appropriate α-halo acyl halide to obtain the both terminal halogenated olefin oligomer. The α-halo acyl halide means an acyl halide where the carbon at α position is halogenated. The α-halo acyl halide is industrially easily available.

The reaction can be conducted as a normal esterification reaction with an acid halide and an alcohol. Specifically, the reaction between the α-halo acyl halide and an oligoolefin containing hydroxyl groups at both terminals may be conducted in the presence of a base such as triethylamine or the like.

The A-B-A type tri-block copolymer is obtained by conducting atom transfer radical polymerization of an ethylenically unsaturated monomer using the above both terminal halogenated olefin oligomer as an initiator. Examples of the ethylenically unsaturated monomer include methacrylic monomers such as methyl methacrylate, ethyl methacrylate, n-propyl methacrylate, isopropyl methacrylate, n-butyl methacrylate, isobutyl methacrylate, t-butyl methacrylate, 2-hydroxyethyl methacrylate, and 2-hydroxypropyl methacrylate; acrylic monomers such as methyl acrylate, ethyl acrylate, n-propyl acrylate, isopropyl acrylate, n-butyl acrylate, isobutyl acrylate, t-butyl acrylate, 2-hydroxyethyl acrylate, 2-hydroxypropyl acrylate, and 2-aminoethyl acrylate; aromatic alkenyl compounds such as styrene; and vinyl cyanide compounds such as acrylonitrile and methacrylonitrile. These compounds can be used solely or two or more of them can be used in combination. When two or more monomers are used, these monomers can be charged into the system simultaneously or sequentially. In the case of charging simultaneously into the system, a copolymer based on a monomer reactivity ratio can be synthesized. In addition, if the monomers are sequentially added, a copolymer having a different block while extending the chain can be synthesized.

In the present invention, it is preferred that a poly($\alpha,\beta$-unsaturated carboxylic acid ester) block is formed at both terminals of the block B by using an $\alpha,\beta$-unsaturated carboxylic acid ester as the ethylenically unsaturated monomer and is partially or completely hydrolyzed to form a carboxyl group. As the ethylenically unsaturated monomer, t-butyl acrylate is preferred. The block A using t-butyl acrylate as an ethylenically unsaturated monomer is readily hydrolyzed to give a block A containing acrylic acid as a constituent unit.

The A-B-A type tri-block copolymer has halogen atoms at both terminals. Thus, by conducting an atom transfer radical coupling reaction, a multi-block copolymer having a higher molecular weight can also be synthesized. The atom transfer radical coupling is a publicly known coupling reaction which utilizes the reactivity of a radical (e.g., see e-Polymers 2005, No. 49, pp 1-11). In general, when a tri-block copolymer is used in which a vinyl polymer block is formed from a monomer, such as styrene, which causes a recombination reaction as a main termination reaction, a multi-block copolymer can be directly synthesized by conducing atom transfer radical coupling. On the other hand, a tri-block copolymer formed from a monomer such as methyl methacrylate, which causes two types, recombination and disproportionation as a termination reaction, can be converted into a multi-block copolymer by conducting atom transfer radical coupling after introducing a monomer such as styrene, which causes a recombination reaction, to the terminals by atom transfer radical polymerization where necessary.

In the atom transfer radical polymerization, the polymerization is preferably conducted using an organic halogenated compound or a halogenated sulfonyl compound as an initiator and a metal complex containing, as a central metal, an element of Group 8, 9, 10, or 11 in the periodic table, as a catalyst (e.g., see Matyjaszewski et al., the Journal of American Chemical Society (J. Am. Chem. Soc.), 1995, Vol. 117, p 5614, Macromolecules, 1995, Vol. 28, p 7901, Science, 1996, Vol. 272, p 866, or Sawamoto et al., Macromolecules, 1995, Vol. 28, p 1721).

The transition metal complex used as the catalyst for the atom transfer radical polymerization is not particularly limited, but examples thereof include complexes of monovalent and zero-valent coppers, divalent ruthenium, divalent iron, and divalent nickel. Among them, complexes of copper are preferred in light of cost and reaction control. Examples of monovalent copper compounds include cuprous chloride, cuprous bromide, cuprous iodide, cuprous cyanide, cuprous oxide, and cuprous perchlorate. Among them, cuprous chloride and cuprous bromide are preferred in light of the polymerization control.

The ligand used for the metal complex is not particularly limited, but may be determined appropriately from the relationship with the required reaction rate in view of the initiator, the monomer, and the solvent. When a monovalent copper compound is used, 2,2'-bipyridyl compounds such as 2,2'-bipyridyl and derivatives thereof (e.g., 4,4'-dinoryl-2,2'-bipyridyl, 4,4'-di(5-noryl)-2,2'-bipyridyl etc.), 1,10-phenanthroline compounds such as 1,10-phenanthroline and derivatives thereof (e.g., 4,7-dinoryl-1,10-phenanthroline, 5,6-dinoryl-1,10-phenanthroline etc.), polyamines such as tetramethyldiethylenetriamine (TMEDA), pentamethyldiethylenetriamine (PMDETA), and hexamethyl(2-aminoethyl)amine, and the like can be used as ligands.

In addition, a tris triphenylphosphine complex (RuCl$_2$(PPh$_3$)$_3$) of divalent ruthenium chloride is also preferred as a catalyst. When a ruthenium compound is used as a catalyst, aluminum alkoxides may be added as an activator. In addition, a bis triphenylphosphine complex ($FeCl_2(PPh_3)_2$) of divalent iron, a bis triphenylphosphine complex ($NiCl_2(PPh_3)_2$) of divalent nickel, and a bis tributylphosphine complex ($NiBr_2(PBu_3)_2$) of divalent nickel are also preferred as catalysts.

The polymerization reaction can be conducted normally in the range from room temperature to 200° C. and preferably in the range from 50° C. to 100° C.

In the above manner, the multi-block copolymer having the A-B-A type tri-block copolymer structure is obtained. In the present invention, the multi-block copolymer having the A-B-A type tri-block copolymer structure is preferably subjected to hydrolysis to form a carboxyl group in the block A. The hydrolysis can be conducted by, for example, dissolving the obtained multi-block copolymer having the A-B-A type tri-block copolymer structure in a solvent and adding trifluoroacetic acid thereto. As the solvent, for example, chloroform, toluene, tetrahydrofuran (THF), and the like are preferred. The temperature for the hydrolysis is preferably from 10° C. to 50° C. The time period for the hydrolysis is preferably 2 hours to 24 hours. The solvent is preferably removed by distillation under reduced pressure after the hydrolysis.

Next, the carboxyl group formed in the block A is neutralized with a metal ion. As a neutralizer, for example, a metal compound is preferred. Examples of the metal compound include metal hydroxides such as magnesium hydroxide, zinc hydroxide, calcium hydroxide, sodium hydroxide, lithium hydroxide, potassium hydroxide, and copper hydroxide; metal oxides such as magnesium oxide, calcium oxide, zinc oxide, and copper oxide; and metal carbonates such as magnesium carbonate, zinc carbonate, calcium carbonate, sodium carbonate, lithium carbonate, and potassium carbonate.

The golf ball material of the present invention preferably has a slab hardness of 35 or more, more preferably 40 or more, and preferably has a slab hardness of 70 or less, more preferably 65 or less in Shore D hardness. If the slab hardness of the golf ball material of the present invention exceeds 70 in Shore D hardness, the durability is lowered. Further, if the slab hardness of the golf ball material is less than 35 in Shore D hardness, the resilience is lowered.

(2) Golf Ball

The golf ball material of the present invention can improve the adhesion between a constituent member containing an ionomer resin and a constituent member containing a polyurethane in a golf ball. The present invention further provides a golf ball utilizing the properties of the golf ball material. In other words, the present invention includes a golf ball having a constituent member containing an ionomer resin and a constituent member containing a polyurethane, wherein an adhesive layer containing the golf ball material of the present invention is interposed between the constituent member containing the ionomer resin and the constituent member containing the polyurethane (First embodiment), and a golf ball having a constituent member containing the golf ball material of the present invention and a constituent member containing a polyurethane, wherein the constituent member containing the golf ball material is adjacent to the constituent member containing the polyurethane (Second embodiment).

It should be noted that the constituent members constituting the golf ball of the present invention mean a core, an intermediate layer, a cover, and the like, and an adhesive layer adhering these members and a coating film formed on the surface of the golf ball body are not included. For example, even in the case of a golf ball having a core, an intermediate layer covering the core, and a cover covering the intermediate layer, wherein an adhesive layer is interposed between the intermediate layer and the cover, the golf ball is referred to as a three-piece golf ball composed of three constituent members, namely, a core, an intermediate layer, and a cover.

Examples of the golf ball of the first embodiment include a two-piece golf ball having a core and a cover covering the core, wherein the core contains an ionomer resin, the cover contains a polyurethane, and an adhesive layer containing the golf ball material of the present invention is interposed between the core and the cover; a three-piece golf ball having a core, an intermediate layer covering the core, and a cover covering the intermediate layer, wherein the intermediate layer contains an ionomer resin, the cover contains a polyurethane, and an adhesive layer containing the golf ball material of the present invention is interposed between the intermediate layer and the cover; a multi-piece golf ball having a core, two or more intermediate layers covering the core, and a cover covering the intermediate layers, wherein one layer of the adjacent intermediate layers contains an ionomer resin, the other layer of the adjacent intermediate layers contains a polyurethane, and an adhesive layer containing the golf ball material of the present invention is interposed between the one layer and the other layer; and a multi-piece golf ball having a core, two or more intermediate layers covering the core, and a cover covering the intermediate layers, wherein the outermost intermediate layer contains an ionomer resin, the cover contains a polyurethane, and an adhesive layer containing the golf ball material of the present invention is interposed between the outermost intermediate layer and the cover.

Examples of the golf ball of the second embodiment include a two-piece golf ball having a core and a cover covering the core, wherein the core contains the golf ball material of the present invention and the cover contains a polyurethane; a three-piece golf ball having a core, an intermediate layer covering the core, and a cover covering the intermediate layer, wherein the intermediate layer contains the golf ball material of the present invention and the cover contains a polyurethane; a multi-piece golf ball having a core, two or more intermediate layers covering the core, and a cover covering the intermediate layers, wherein one layer of the adjacent intermediate layers contains the golf ball material of the present invention and the other layer of the adjacent intermediate layers contains a polyurethane; and a multi-piece golf ball having a core, two or more intermediate layers covering the core, and a cover covering the intermediate layers, wherein the outermost intermediate layer contains the golf ball material of the present invention and the cover contains a polyurethane. In the golf ball of the second embodiment, an adhesive layer may be interposed between the constituent member containing the golf ball material of the present invention and the constituent member containing the polyurethane.

In the golf ball of the second embodiment, the constituent member containing the golf ball material of the present invention preferably further contains an ionomer resin. The mass ratio of the ionomer resin to the golf ball material is preferably 20/80 or more, more preferably 30/70 or more, and is preferably 80/20 or less, more preferably 70/30 or less. If the mass ratio of the ionomer resin to the golf ball material falls within the above range, the adhesion to the constituent member containing the polyurethane is enhanced and a golf ball having high durability and high resilience is obtained.

The golf ball of the second embodiment can be further modified as follows (third embodiment). Examples of the golf ball of the third embodiment include a three-piece golf ball having a core, an intermediate layer covering the core, and a cover covering the intermediate layer, wherein the core contains an ionomer resin, the intermediate layer contains the golf ball material of the present invention, and the cover contains a polyurethane; and a multi-piece golf ball having a core, two intermediate layers covering the core, and a cover covering the intermediate layers, wherein the inner intermediate layer contains an ionomer resin, the outer intermediate layer contains the golf ball material of the present invention, and the cover contains a polyurethane. In the golf ball of the third embodiment, the content of the golf ball material of the present invention in the resin component of the constituent member containing the golf ball material of the present invention is preferably 50 mass % or more, more preferably 70 mass % or more, even more preferably 90 mass % or more, and most preferably 100 mass %.

The ionomer resin includes, for example, one prepared by neutralizing at least a part of a carboxyl group in a binary copolymer composed of an olefin and an α,β-unsaturated carboxylic acid having 3 to 8 carbon atoms with a metal ion, one prepared by neutralizing at least a part of carboxyl group in a ternary copolymer composed of an olefin, an α,β-unsaturated carboxylic acid having 3 to 8 carbon atoms and an α,β-unsaturated carboxylic acid ester with a metal ion, or a mixture thereof. The olefin preferably includes an olefin having 2 to 8 carbon atoms. Examples of the olefin are ethylene, propylene, butane, pentene, hexene, heptene, and octene. The olefin more preferably includes ethylene. Examples of the α,β-unsaturated carboxylic acid having 3 to 8 carbon atoms are acrylic acid, methacrylic acid, fumaric acid, maleic acid and crotonic acid. Among these, acrylic acid and methacrylic acid are particularly preferred. Examples of the α,β-unsaturated carboxylic acid ester include methyl, ethyl, propyl, n-butyl, isobutyl ester of acrylic acid, methacrylic acid, fumaric acid, maleic acid, or the like. Among these, acrylic acid ester and methacrylic acid ester are particularly preferred. As the ionomer resin, preferred are the metal ion-neutralized product of the binary copolymer composed of ethylene-(meth)acrylic acid, and the metal ion-neutralized product of the ternary copolymer composed of ethylene-(meth)acrylic acid-(meth)acrylic acid ester.

Specific examples of the ionomer resin include trade name "Himilan (registered trademark) (e.g. the binary copolymerized ionomer such as Himilan 1555 (Na), Himilan 1557 (Zn), Himilan 1605 (Na), Himilan 1706 (Zn), Himilan 1707 (Na), Himilan AM3711 (Mg); and the ternary copolymerized ionomer such as Himilan 1856 (Na), Himilan 1855 (Zn))" commercially available from Du Pont-Mitsui Polychemicals Co., Ltd.

Further, examples include "Surlyn (registered trademark) (e.g. the binary copolymerized ionomer such as Surlyn 8945 (Na), Surlyn 9945 (Zn), Surlyn 8140 (Na), Surlyn 8150 (Na), Surlyn 9120 (Zn), Surlyn 9150 (Zn), Surlyn 6910 (Mg), Surlyn 6120 (Mg), Surlyn 7930 (Li), Surlyn 7940 (Li), Surlyn AD8546 (Li); and the ternary copolymerized ionomer such as Surlyn 8120 (Na), Surlyn 8320 (Na), Surlyn 9320 (Zn), Surlyn 6320 (Mg))" and the ternary copolymerized ionomer such as (HPF 1000 (Mg), HPF 2000 (Mg))" commercially available from E.I. du Pont de Nemours and Company.

Further, examples include "Iotek (registered trademark) (e.g. the binary copolymerized ionomer such as Iotek 8000 (Na), Iotek 8030 (Na), Iotek 7010 (Zn), Iotek 7030 (Zn); and the ternary copolymerized ionomer such as Iotek 7510 (Zn), Iotek 7520 (Zn))" commercially available from ExxonMobil Chemical Corporation.

It is noted that Na, Zn, Li an Mg described in the parentheses after the trade names include metal types of neutralizing metal ions for the ionomer resins. The ionomer resin may be used alone or a mixture of at least two of them.

Next, the constituent member containing the polyurethane will be described. The polyurethane is a polymer having a plurality of urethane bonds within the molecular chain, and is obtained by, for example, conducting reaction between a polyol and a polyisocyanate. Further, a chain extension reaction with a chain extender such as a low-molecular-weight polyol or a low-molecular-weight polyamine may be conducted where necessary.

The polyisocyanate component constituting the polyurethane is not particularly limited, as long as it has two or more isocyanate groups. Examples of the polyisocyanate are aromatic polyisocyanates such as 2,4-toluene diisocyanate, 2,6-toluene diisocyanate, a mixture (TDI) of 2,4-toluene diisocyanate and 2,6-toluene diisocyanate, 4,4'-diphenylmethane diisocyanate (MDI), 1,5-naphthylene diisocyanate (NDI), 3,3'-bitolylene-4,4'-diisocyanate (TODI), xylylene diisocyanate (XDI), tetramethylxylylene diisocyanate (TMXDI), and paraphenylene diisocyanate (PPDI); and alicyclic polyisocyanates or aliphatic polyisocyanates such as 4,4'-dicyclohexylmethane diisocyanate ($H_{12}MDI$), hydrogenated xylylene diisocyanate ($H_6XDI$), hexamethylene diisocyanate (HDI), isophorone diisocyanate (IPDI), and norbornane diisocyanate (NBDI). The polyisocyanate can be used solely or the mixture of at least two of them can be used.

In view of improving the abrasion-resistance, the aromatic polyisocyanate is preferably used as the polyisocyanate component of the polyurethane. Use of the aromatic polyisocyanate improves the mechanical properties of the obtained polyurethane and provides the cover with the excellent abrasion-resistance. In addition, in view of improving the weather resistance, as the polyisocyanate component of the polyurethane, non-yellowing type polyisocyanates such as TMXDI, XDI, HDI, $H_6XDI$, IPDI, $H_{12}MDI$ and NBDI are preferably used. More preferably, 4,4'-dicyclohexylmethane diisocyanate ($H_{12}MDI$) is used. Since 4,4'-dicyclohexylmethane diisocyanate ($H_{12}MDI$) has a rigid structure, the mechanical properties of the resulting polyurethane are enhanced, and thus the cover which is excellent in abrasion-resistance can be obtained.

The polyol component constituting the polyurethane is not particularly limited, as long as it has a plurality of hydroxyl groups, and such examples include a low-molecular weight polyol that is used as a chain extender and a polymer polyol that constitutes a soft segment. Examples of the low-molecular weight polyol include a diol such as ethylene glycol, diethylene glycol, triethylene glycol, 1,3-butanediol, 1,4-butanediol, neopentyl glycol, 1,6-hexanediol; a triol such as glycerin, trimethylol propane, and hexanetriol. Examples of the polymer polyol include a polyether polyol such as polyoxyethylene glycol (PEG), polyoxypropylene glycol (PPG), and polyoxytetramethylene glycol (PTMG); a condensed polyester polyol such as polyethylene adipate (PEA), polybutylene adipate (PBA), and polyhexamethylene adipate (PHMA); a lactone polyester polyol such as poly-ε-caprolactone (PCL); a polycarbonate polyol such as polyhexamethylene carbonate; and an acrylic polyol. The above polyols may be used alone or as a mixture of at least two of them. The polyol component constituting the polyurethane is preferably polyoxytetramethylene glycol.

A number average molecular weight of the polymer polyol is not particularly limited, and for example, it is preferably 400 or more, more preferably 1,000 or more. If the number average molecular weight of the polymer polyol is too small, the resultant polyurethane becomes hard and the shot feeling of the golf ball deteriorates. The upper limit of the number average molecular weight of the polymer polyol is not particularly limited, and it is preferably 10,000, more preferably 8,000.

The polyamine component that constitutes the polyurethane where necessary may include any polyamine, as long as it has at least two amino groups. The polyamine includes an aliphatic polyamine such as ethylenediamine, propylenediamine, butylenediamine, and hexamethylenediamine, an alicyclic polyamine such as isophoronediamine, piperazine, and an aromatic polyamine such as phenylenediamine, tolylenediamine, diethyltoluenediamine, and dimethylthiotoluenediamine, xylylenediamine, and diphenylmethanediamine.

The polyurethane preferably has a slab hardness of 5 or more, more preferably 10 or more, and even more preferably 15 or more in Shore D hardness. If the polyurethane has a slab hardness of 5 or more in Shore D hardness, the shape of the constituent member is maintained. The polyurethane preferably has a slab hardness of 60 or less, more preferably 55 or less, and even more preferably 50 or less in Shore D hardness. If the polyurethane has a slab hardness of 60 or less in Shore D hardness, the approach spin performance becomes better.

Specific examples of the polyurethane include "Elastollan (registered trademark) (e.g. Elastollan XNY90A, Elastollan XNY97A, Elastollan XNY585)" commercially available from BASF Japan Ltd., and "Resamine (registered trademark) (e.g. "Resamine P4585LS, Resamine PS62490)" available from Dainichiseika Color & Chemicals Mfg. Co., Ltd.

The content of the polyurethane in the resin component of the constituent member containing the polyurethane is preferably 50 mass % or more, more preferably 60 mass % or more, even more preferably 70 mass % or more, and most preferably 90 mass % or more.

The constituent member of the golf ball of the present invention may contain another resin component, as long as it does not impair the effects of the present invention. Examples of the other resin component include thermoplastic polyamide elastomers, thermoplastic polyester elastomers, and thermoplastic styrene elastomers.

Next, the adhesive layer in the first embodiment and the second embodiment will be described. The adhesive layer is obtained by applying a liquid where an adhesive resin component is dissolved or dispersed in a solvent to the surface of the constituent member. In light of workability, application with a spray gun is preferred. After the application, the solvent is volatilized and the adhesive layer is formed. Examples of preferable solvents include toluene, isopropyl alcohol, xylene, methyl ethyl ketone, methyl isobutyl ketone, ethylene glycol monomethyl ether, ethylbenzene, propylene glycol monomethyl ether, isobutyl alcohol, and ethyl acetate.

The thickness of the adhesive layer is preferably 3 μm or more, and more preferably 5 μm or more. From the view point that the adhesive layer is readily formed, the thickness is preferably 300 μm or less, more preferably 100 μm or less, even more preferably 50 μm or less, and yet even more preferably 20 μm or less. The thickness is measured by observing a cross section of the golf ball with a microscope. When the constituent member has concavities and convexities on its surface by surface roughening treatment, the thickness is measured directly above a convex part.

The adhesive layer may contain additives such as a coloring agent (typically, titanium dioxide), a phosphate-based stabilizer, an antioxidant, a light stabilizer, a fluorescent brightener, an ultraviolet absorber, and an anti-blocking agent.

In the first embodiment, as the adhesive resin component, the golf ball material of the present invention is essentially used. Although only the golf ball material of the present invention is used as the adhesive resin component, a commercial adhesive resin may be used in combination, as long as the the effect of the present invention does not deteriorate. In this case, the content of the golf ball material of the present invention in the adhesive resin component is preferably 20 mass % or more, more preferably 25 mass % or more, even more preferably 30 mass % or more. In the golf ball of the second embodiment, the golf ball material of the present invention or the commercial adhesive resin may be used as the adhesive resin component of the adhesive layer.

As a commercially-available adhesive resin, a two-component curing type thermosetting resin is suitably used. Specific examples of the two-component curing type thermosetting resin include epoxy resins, urethane resins, acrylic resins, polyester resins, and cellulose resins. In light of mechanical properties (e.g., strength at break) and durability of the adhesive layer, two-component curing type epoxy resins and two-component curing type urethane resins are preferred.

A two-component curing type epoxy resin is obtained by curing an epoxy resin with a polyamide type curing agent. Examples of epoxy resins used in two-component curing type epoxy resins include bisphenol A type epoxy resins, bisphenol F type epoxy resins, and bisphenol AD type epoxy resins. A bisphenol A type epoxy resin is obtained by a reaction between bisphenol A and an epoxy group-containing compound such as epichlorohydrin or the like. A bisphenol F type epoxy resin is obtained by a reaction between bisphenol F and an epoxy group-containing compound. A bisphenol AD type epoxy resin is obtained by a reaction between bisphenol AD and an epoxy group-containing compound. In light of balance among flexibility, chemical resistance, heat resistance, and toughness, bisphenol A type epoxy resins are preferred.

The polyamide type curing agent has a plurality of amino groups and one or more amide groups. The amino groups can react with epoxy groups. Specific examples of the polyamide type curing agent include polyamide amine curing agents and modified products thereof. The polyamide amine curing agent is obtained by a condensation reaction of a polymerized fatty acid and a polyamine. The typical polymerized fatty acid is obtained or synthesized by heating natural fatty acids including a large amount of unsaturated fatty acids such as linoleic acid and linolenic acid in the presence of a catalyst. Specific examples of unsaturated fatty acids include tall oil, soybean oil, linseed oil, and fish oil. A hydrogenated polymerized fatty acid having a dimer content of 90% by mass or greater and a trimer content of 10% by mass or less is preferred. Examples of preferable polyamines include polyethylene diamines, polyoxyalkylene diamines, and derivatives thereof.

When mixing the epoxy resin and the polyamide type curing agent, the ratio of the epoxy equivalent of the epoxy resin to the amine active hydrogen equivalent of the polyamide type curing agent is preferably from 1.0/1.4 to 1.0/1.0.

The two-component curing type urethane resin is obtained by a reaction between a base material and a curing agent. The two-component curing type urethane resin obtained by a reaction between a base material containing a polyol component and a curing agent containing a polyisocyanate or a derivative thereof, and the two-component curing type urethane resin obtained by a reaction between a base material containing an isocyanate group-terminated urethane prepolymer and a curing agent having active hydrogen can be used. Particularly, the two-component curing type urethane resin obtained by a reaction between a base material containing a polyol component and a curing agent containing a polyisocyanate or a derivative thereof is preferred.

As the polyol component of the base material, a urethane polyol is preferably used. The urethane polyol has urethane bonds and two or more hydroxyl groups. Preferably, the urethane polyol has hydroxyl groups at the terminals thereof. The urethane polyol can be obtained by conducting a reaction between a polyol and a polyisocyanate at such a ratio that the hydroxyl groups of the polyol component are excessive in mole ratio with respect to the isocyanate groups of the polyisocyanate.

Examples of the polyol used for producing the urethane polyol include those exemplified as the polyol component forming the polyurethane contained in the constituent member of the golf ball.

Examples of the polyisocyanate used for producing the urethane polyol include those exemplified as the polyisocyanate component forming the polyurethane contained in the constituent member of the golf ball.

In the reaction between the polyol and the polyisocyanate for producing the urethane polyol, a known catalyst can be used. A typical catalyst is dibutyl tin dilaurate.

In light of strength of the adhesive layer, the proportion of the urethane bonds included in the urethane polyol is preferably 0.1 mmol/g or more. In light of followability of the adhesive layer to the constituent member, the proportion of the urethane bonds included in the urethane polyol is preferably 5 mmol/g or less. The proportion of the urethane bonds can be adjusted by adjusting the molecular weight of the polyol used as a raw material for the urethane polyol, and the blending ratio of the polyol to the polyisocyanate.

From the standpoint of making the time required for the reaction between the base material and the curing agent short, the weight average molecular weight of the urethane polyol is preferably 4,000 or more and more preferably 4,500 or more. In light of adhesion of the adhesive layer, the weight average molecular weight of the urethane polyol is preferably 10,000 or less and more preferably 9,000 or less.

In light of adhesion of the adhesive layer, the hydroxyl value (mg KOH/g) of the urethane polyol is preferably 15 or more, and more preferably 73 or more. From the standpoint of making the time required for the reaction between the base material and the curing agent short, the hydroxyl value of the urethane polyol is preferably 130 or less and more preferably 120 or less.

The base material may contain, together with the urethane polyol, a polyol that does not have any urethane bond. The aforementioned polyol that is the raw material for the urethane polyol can be used in the base material. Polyols compatible with the urethane polyol are preferred. From the standpoint of making the time required for the reaction between the base material and the curing agent short, the proportion of the urethane polyol in the base material on the solid content basis is preferably 50 mass % or more, and more preferably 80 mass % or more. Ideally, the proportion is 100 mass %.

The curing agent includes the polyisocyanate or the derivative thereof. The above-mentioned polyisocyanate used as a raw material for the urethane polyol is used for the curing agent.

The core of the golf ball of the present invention is preferably formed from a publicly known rubber composition (hereinafter, simply referred to as "core rubber composition" occasionally). The core can be molded by, for example, heat-pressing a rubber composition containing a base rubber, a co-crosslinking agent and a crosslinking initiator.

As the base rubber, in particular, preferred is the high cis-polybutadiene having cis-1,4 bond in a proportion of 40% or more, more preferably 70% or more, even more preferably 90% or more in view of its superior repulsion property. The co-crosslinking agent preferably includes an $\alpha,\beta$-unsaturated carboxylic acid having 3 to 8 carbon atoms or a metal salt thereof, and more preferably a metal salt of an acrylic acid or a metal salt of a methacrylic acid. As the metal constituting the metal salt, preferred is zinc, magnesium, calcium, aluminum or sodium. Among them, zinc is more preferred. The amount of the co-crosslinking agent to be used is preferably 20 parts by mass or more and 50 parts by mass or less with respect to 100 parts by mass of the base rubber. As the crosslinking initiator, an organic peroxide is preferably used. Specific examples thereof are dicumyl peroxide, 1,1-bis(t-butylperoxy)-3,3,5-trimethylcyclohexane, 2,5-dimethyl-2,5-di(t-butylperoxy)hexane, and di-t-butyl peroxide. Among them, dicumyl peroxide is preferable. An amount of the crosslinking initiator to be blended in the rubber composition is preferably 0.2 part by mass or more, more preferably 0.3 part by mass or more, and is preferably 3 parts by mass or less, more preferably 2 parts by mass or less with respect to 100 parts by mass of the base rubber. Further, the core rubber composition may further contain an organic sulfur compound. As the organic sulfur compound, diphenyl disulfides or thiophenols may be preferably used. An amount of the organic sulfur compound to be blended is preferably 0.1 part by mass or more, more preferably 0.3 part by mass or more, and is preferably 5.0 parts by mass or less, more preferably 3.0 parts by mass or less with respect to 100 parts by mass of the base rubber.

The core rubber composition may further contain a weight adjusting agent such as zinc oxide, barium sulfate, an antioxidant, or a colored powder in addition to the base rubber, the co-crosslinking agent, the crosslinking initiator, and the organic sulfur compound. The conditions for press-molding the core rubber composition should be determined appropriately based on the rubber composition, and the press-molding is preferably carried out at the temperature in a range from 130° C. to 200° C. for 10 to 60 minutes, or in a two-step heating, for example, for 20 to 40 minutes at the temperature of 130° C. to 150° C., and continuously for 5 to 15 minutes at the temperature of 160° C. to 180° C.

EXAMPLES

Hereinafter, the present invention will be described in detailed by way of example. The present invention is not limited to examples described below. Various changes and modifications can be made without departing from the spirit and scope of the present invention.

[Evaluation Methods]
(1) Slab Hardness (Shore D Hardness)
Sheets with a thickness of about 2 mm were produced by injection molding the intermediate layer composition or the cover composition, and stored at 23° C. for two weeks. Three or more of these sheets were stacked on one another so as not to be affected by the measuring substrate on which the sheets were paced, and the hardness of the stack was measured with a type P1 auto loading durometer manufactured by Kobunshi Keiki Co., Ltd., provided with a Shore D type spring hardness tester prescribed in ASTM-D2240.
(2) Resilience
A 198.4 g of metal cylindrical object was forced to collide with each golf ball at a speed of 40 m/sec, and the speeds of the cylindrical object and the golf ball before and after the collision were measured. Based on these speeds and the mass of each object, coefficient of restitution for each golf ball was calculated. The measurement was conducted by using twelve golf balls for each golf ball, and the average value was regarded as the coefficient of restitution for the golf ball. The coefficient of restitution of golf ball No. 8 was defined as an index of 100, and the coefficient of restitution of each golf ball was represented by converting the coefficient of restitution of each golf ball into this index.
(3) Durability
A metal-head driver W#1 ("XXIO") available from SRI sports Ltd, Shaft hardness: S, Loft angle: 11°) was installed on a swing robot M/C manufactured by TRUETEMPER CO, and the head speed was set to 45 m/sec. Each golf ball was stored in a constant temperature reservoir kept at the temperature of 23° C. for 12 hours. Immediately after taking each golf ball out of the reservoir, they were repeatedly hit with the driver. The number of hits required to break the golf ball was counted. This measurement was conducted by using twelve golf balls for each golf ball. The number of hits for golf ball No. 8 was defined as an index of 100, and the durability of each golf ball was represented by converting the number of hits for each golf ball into this index. A greater index value indicates that the durability of the golf ball is excellent.
[Synthesis of Multi-Block Copolymer]
As the olefin oligomer containing hydroxyl groups at both terminals, Polytail H manufactured by Mitsubishi Chemical Corporation (both terminal hydroxylated ethylene-1-butene copolymer (formula (2): for convenience, the formula (2) is shown as a block copolymer of an ethylene block and a 1-butene block, but Polytail H is not limited thereto), number average molecular weight: 2800, OH value: 45 mg KOH/g) was used. The both terminal halogenated olefin oligomer was produced by conducting an esterification reaction using Polytail H and 2-bromoisobutyryl bromide. Specifically, 100 mL of dehydrated chloroform was added to 20 g of Polytail H manufactured by Mitsubishi Chemical Corporation. The mixture was heated to dissolve Polytail H. Then, 5.8 mL of distilled triethylamine was added, and 5.0 mL of 2-bromoisobutyryl bromide/20 mL of a dehydrated chloroform solution was dripped in, followed by stirring at normal temperature for 24 hours. Then, the solution was poured into 1M HCL/methanol to conduct reprecipitation. The reprecipitated product was filtered to obtain a both terminal halogenated olefin oligomer (formula (3)). The yield was 100%.

An A-B-A type tri-block copolymer was synthesized using the both terminal halogenated olefin oligomer as a macro initiator. Specifically, 30 g (6 mmol) of the obtained both terminal halogenated olefin oligomer and 0.893 g (6 mmol) of CuBr(I) were charged into an eggplant flask, nitrogen substitution was conducted, and then o-xylene was added. Thereafter, 1.257 mL of N,N,N',N'',N''-pentamethyldiethylenetriamine was added, and 72 mL of t-butyl acrylate was added, followed by stirring at 120° C. for 5 hours. After the end of the reaction, the reaction solution was poured into methanol to conduct reprecipitation. The reprecipitated product was filtered to obtain an A-B-A type tri-block copolymer (formula (4)). The monomer conversion rate was 48%. The number average molecular weight of the obtained A-B-A type tri-block copolymer was 9600. In the obtained A-B-A type tri-block copolymer, the block B is a polyolefin block, and at both terminals thereof, a poly t-butyl acrylate block is formed as the block A.

Next, the obtained A-B-A type tri-block copolymer was hydrolyzed to form a carboxyl group as an acid functional group in the block A, and then, the carboxyl group was neutralized with a metal compound. Specifically, 10 g of the obtained A-B-A type tri-block copolymer was dissolved in 200 mL of chloroform, and 60 mL of trifluoroacetic acid was added, followed by stirring at 23° C. for 24 hours. After the end of the reaction, chloroform, which is the solvent, was removed by distillation under reduced pressure. The poly t-butyl acrylate block, which is the block A, was hydrolyzed to obtain an A-B-A type tri-block copolymer (formula (5)) having a block A with a carboxyl group formed therein. As a result of the hydrolysis, the block A has changed to a poly acrylic acid block. The number average molecular weight of the A-B-A type tri-block copolymer having a block A with a carboxyl group formed therein was 10800.

For the neutralization of the carboxyl group formed in the block A, 240 mL of a 5N sodium hydroxide solution was added to a dispersion liquid obtained by dispersing the A-B-A type tri-block copolymer in which the carboxyl group is formed into 80 ml of methanol, followed by stirring sufficiently. Then, vacuum concentration was conducted to obtain an A-B-A type tri-block copolymer in which the carboxyl group of the block A is neutralized with sodium ion (hereinafter, may be referred to merely as "polyolefin ionomer"; formula (6)). The degree of neutralization of the carboxyl group of the block A was 100%.

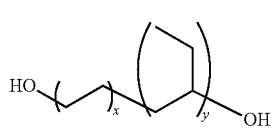

(2)

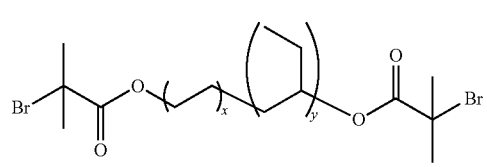

(3)

-continued

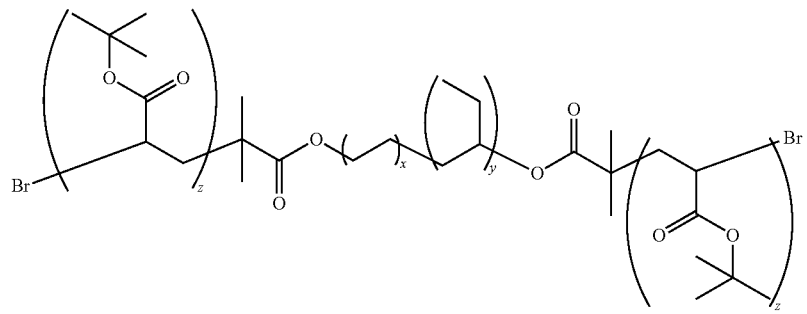

(4)

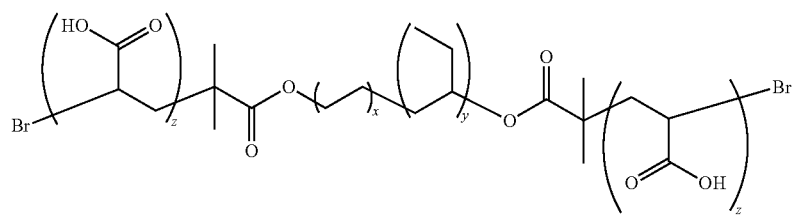

(5)

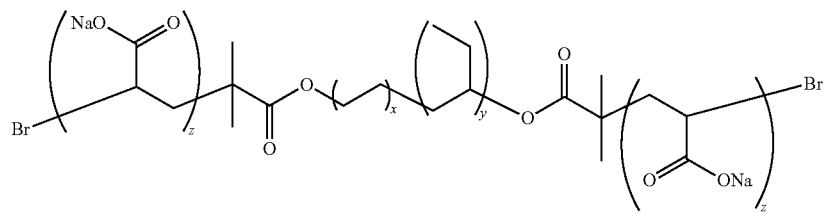

(6)

[Production of Golf Ball]

(1) Production of Core

A rubber composition having a formulation shown in Table 1 was kneaded and hot-pressed at 170° C. for 15 minutes in upper and lower molds each having a hemispherical cavity, to obtain a spherical core.

TABLE 1

| Rubber composition | Formulation (parts by mass) |
| --- | --- |
| Polybutadiene rubber | 100 |
| Zinc acrylate | 35 |
| Zinc oxide | Appropriate amount *) |
| Dicumyl peroxide | 0.9 |
| Bis(pentabromophenyl)disulfide | 0.7 |

TABLE 1-continued

| Rubber composition | Formulation (parts by mass) |
| --- | --- |
| Core diameter (mm) | 38.5 |
| Core mass (g) | 34.9 |

*) Zinc oxide: Adjustment was made such that the golf ball had a mass of 45.4 g.
Polybutadiene rubber: "BR-730 (high-cis polybutadiene)" manufactured by JSR Corporation.
Zinc acrylate: "ZNDA-90S" manufactured by Nihon Jyoryu Kogyo Co., Ltd.
Zinc oxide: "Ginrei (registered trademark) R" manufactured by Toho Zinc Co., Ltd.
Dicumyl peroxide: "Percumyl (registered trademark) D" manufactured by NOF Corporation.

(2) Preparation of Intermediate Layer Composition and Cover Composition.

Blending materials shown in Table 2 were mixed with a twin-screw kneading extruder to prepare the intermediate layer composition and the cover composition in the form of the pellet. The extrusion of the intermediate layer composition was conducted under the conditions of a screw diameter of 45 mm, a screw rotational speed of 200 rpm, screw L/D=35, and a cylinder temperature of 140 to 200° C. The extruding conditions for the cover composition were a screw diameter of 45 mm, a screw rotational speed of 200 rpm, and screw L/D=35, and the blended product was heated to 160 to 230° C. at the die position of the extruder.

TABLE 2

| | | Golf ball No. | | | | | | | | | | | |
| --- | --- | --- | --- | --- | --- | --- | --- | --- | --- | --- | --- | --- | --- |
| | | 1 | 2 | 3 | 4 | 5 | 6 | 7 | 8 | 9 | 10 | 11 | 12 |
| Intermediate layer composition (parts by mass) | Ionomer resin | 90 | 75 | 50 | 25 | 0 | 50 | 100 | 100 | 90 | 75 | 50 | 25 |
| | Polyolefin ionomer | 10 | 25 | 50 | 75 | 100 | 50 | 0 | 0 | 10 | 25 | 50 | 75 |
| Intermediate layer slab hardness (Shore D) | | 64 | 64 | 64 | 64 | 64 | 64 | 64 | 64 | 64 | 64 | 64 | 64 |

TABLE 2-continued

| | Golf ball No. | | | | | | | | | | | |
|---|---|---|---|---|---|---|---|---|---|---|---|---|
| | 1 | 2 | 3 | 4 | 5 | 6 | 7 | 8 | 9 | 10 | 11 | 12 |
| Intermediate layer thickness (mm) | 1 | 1 | 1 | 1 | 1 | 1 | 1 | 1 | 1 | 1 | 1 | 1 |
| Kind of adhesive agent | 1 | 1 | 1 | 1 | 1 | 2 | 2 | 1 | None | None | None | None |
| Cover composition Elastollan XNY85A | 100 | 100 | 100 | 100 | 100 | 100 | 100 | 100 | 100 | 100 | 100 | 100 |
| (party by mass) Titanium oxide | 4 | 4 | 4 | 4 | 4 | 4 | 4 | 4 | 4 | 4 | 4 | 4 |
| Cover composition slab hardness (Shore D) | 32 | 32 | 32 | 32 | 32 | 32 | 32 | 32 | 32 | 32 | 32 | 32 |
| Cover thickness (mm) | 0.5 | 0.5 | 0.5 | 0.5 | 0.5 | 0.5 | 0.5 | 0.5 | 0.5 | 0.50 | 0.5 | 0.5 |
| Properties of  Resilience | 100.1 | 100.3 | 100.6 | 100.8 | 101.1 | 100.6 | 100 | 100 | 100.1 | 100.3 | 100.6 | 100.8 |
| golf balls  Durability | 110 | 140 | 160 | 130 | 90 | 210 | 150 | 100 | 100 | 130 | 150 | 120 |

Notes on Table 2
Ionomer resin: a blend of Himilan AM7329 and Surlyn 8945 in a ratio of 50:50
Himilan AM7329: Zinc ion neutralized ethylene-methacrylic acid copolymer ionomer resin available from Du Pont-Mitsui Polychemicals Co., Ltd.
Surlyn 8945: Sodium ion neutralized ethylene-methacrylic acid copolymer ionomer resin available from E. I. du Pond de Nemours and Company.
Elastollan XNY85A: Polyurethane elastomer available from BASF Japan Ltd.

(3) Production of Golf Ball Body

The intermediate layer composition obtained at (2) was injection-molded on the core obtained at (1), to form an intermediate layer covering the core. The upper and lower molds for forming the intermediate layer each have a hemispherical cavity and pimples, and some of the pimples also serve as hold pins that are extendable and retractable. The hold pins were protruded, and the core was put into the mold and then held by the hold pins. The intermediate layer composition heated to 200° C. to 260° C. at the cylinder portion of an injection unit was injected into the mold clamped under a pressure of 15 MPa, and cooled for 30 seconds to form the intermediate layer.

An adhesive was applied to the surface of the intermediate layer with a spray gun, and kept at 40° C. for 24 hours to form an adhesive layer. As the adhesive, the following adhesives were used.

[Adhesive 1]

A resin composition (trade name "POLIN 750LE", manufactured by SHINTO PAINT CO., LTD.) including a two-component curing type epoxy resin as a base polymer was used as an adhesive. The base material liquid of this resin composition includes 30 parts by mass of a bisphenol A type solid epoxy resin and 70 parts by mass of a solvent. The curing agent liquid of this resin composition includes 40 parts by mass of a modified polyamide amine, 55 parts by mass of a solvent, and 5 parts by mass of titanium oxide. The mass ratio of the base material liquid to the curing agent liquid is 1/1.

[Adhesive 2]

Tetrahydrofuran/water (80 parts by mass/20 parts by mass) and 50 parts by mass of methyl ethyl ketone were mixed. Thirty five parts by mass of the polyolefin ionomer obtained above was added to and dissolved in 65 parts by mass of this mixture solution.

Subsequently, the cover composition was injection-molded on the intermediate layer to form a cover, thereby producing a golf ball. The upper and lower molds for forming the cover each have a hemispherical cavity and pimples, and some of the pimples also serve as hold pins that are extendable and retractable. During the cover formation, the hold pins were protruded, and the core on which the intermediate layer had been formed was put into the mold and then held by the hold pins. The resin heated to 260° C. was injected within 0.3 seconds into the mold clamped under a pressure of 80 ton, and cooled for 30 seconds. Then, the mold was opened, and the golf ball body was taken out therefrom. The surface of the obtained golf ball body was treated with sandblast, marked, and painted with a clear paint. The paint was dried in an oven at 40° C., and a golf ball with a diameter of 42.8 mm and a mass of 45.4 g was obtained.

Table 2 shows the evaluation results of the resilience and durability of the obtained golf balls. From the results in Table 2, the golf balls No. 1 to No. 5 and No. 9 to No. 12 in which the golf ball material of the present invention is used for the intermediate layer have favorable resilience or durability as compared to the conventional golf ball No. 8. In particular, when the mass ratio of the golf ball material of the present invention to the ionomer resin is 20/80 to 80/20, both the resilience and the durability are improved, and the effect thereof is also remarkable. In addition, from the results of the golf balls No. 6 and No. 7, it is recognized that even when the golf ball material of the present invention is used as an adhesive between the intermediate layer containing the ionomer resin and the cover containing the polyurethane, the resilience or the durability is improved.

The present invention is suitable for a golf ball which includes a constituent member containing an ionomer resin and a constituent member containing a polyurethane. This application is based on Japanese Patent application No. 2011-257977 filed on Nov. 25, 2011, the contents of which are hereby incorporated reference.

What is claimed is:

1. A golf ball comprising a constituent member containing an ionomer resin and a constituent member containing a polyurethane, wherein an adhesive layer is interposed between the constituent member containing the ionomer resin and the constituent member containing the polyurethane, wherein the adhesive layer is formed from a liquid where an adhesive resin component is dissolved or dispersed in a solvent, and the adhesive resin component is a golf ball material composed of a multi-block copolymer having an A-B-A type tri-block copolymer structure, wherein a block B has lower polarity than a block A, the block A contains, as a component, an α,β-unsaturated carboxylic acid having 3 to 8 carbon atoms, of which at least a part of carboxyl groups is neutralized with a metal ion, and the block B is a polyolefin block containing, as a component, at least one olefin selected from the group consisting of ethylene, propylene, butene, and pentene.

2. The golf ball according to claim 1, wherein a degree of neutralization of the carboxyl groups of the block A is 10 mole % or more, and the golf ball material has a slab hardness in a range from 35 to 70 in Shore D hardness.

3. The golf ball according to claim 1, wherein the golf ball is a two-piece golf ball having a core and a cover covering the core, the constituent member containing the ionomer resin is the core, and the constituent member containing the polyurethane is the cover.

4. The golf ball according to claim 1, wherein the golf ball is a three-piece golf ball having a core, an intermediate layer covering the core, and a cover covering the intermediate layer, the constituent member containing the ionomer resin is the intermediate layer, and the constituent member containing the polyurethane is the cover.

5. The golf ball according to claim 1, wherein the golf ball is a multi-piece golf ball having a core, two or more intermediate layers covering the core, and a cover covering the intermediate layers, wherein the constituent member containing the ionomer resin is one layer of adjacent intermediate layers and the constituent member containing the polyurethane is another layer of the adjacent intermediate layers.

6. The golf ball according to claim 1, wherein the golf ball is a multi-piece golf ball having a core, two or more intermediate layers covering the core, and a cover covering the intermediate layers, wherein the constituent member containing the ionomer resin is an outer most intermediate layer and the constituent member containing the polyurethane is the cover.

7. The golf ball according to claim 1, wherein the adhesive layer has a thickness in a range from 3 μm to 300 μm.

8. A golf ball comprising a constituent member containing a golf ball material composed of a multi-block copolymer having a block A and a block B that has lower polarity than the block A and a constituent member containing a polyurethane, the constituent member containing the golf ball material being adjacent to the constituent member containing the polyurethane, wherein the constituent member containing the golf ball material further contains an ionomer resin, and a mass ratio of the ionomer resin to the golf ball material is from 20/80 to 80/20, and the multi-block copolymer has an A-B-A type tri-block copolymer structure wherein
  the block A contains, as a component, an α,β-unsaturated carboxylic acid having 3 to 8 carbon atoms, of which at least a part of carboxyl groups is neutralized with a metal ion, and
  the block B is a polyolefin block containing, as a component, at least one olefin selected from the group consisting of ethylene, propylene, butene, and pentene, and
  wherein the golf ball is a multi-piece golf ball having a core, two or more intermediate layers covering the core, and a cover covering the intermediate layers, wherein the constituent member containing the golf ball material is one layer of adjacent intermediate layers and the constituent member containing the polyurethane is another layer of the adjacent intermediate layers.

9. The golf ball according to claim 8, wherein a degree of neutralization of the carboxyl groups of the block A is 10 mole % or more, and the golf ball material has a slab hardness in a range from 35 to 70 in Shore D hardness.

10. The golf ball according to claim 8, wherein an adhesive layer is further interposed between the constituent member containing the golf ball material and the constituent member containing the polyurethane.

11. A golf ball comprising a constituent member containing a golf ball material composed of a multi-block copolymer having a block A and a block B that has lower polarity than the block A and a constituent member containing a polyurethane, the constituent member containing the golf ball material being adjacent to the constituent member containing the polyurethane, wherein the constituent member containing the golf ball material further contains an ionomer resin, and a mass ratio of the ionomer resin to the golf ball material is from 20/80 to 80/20, and the multi-block copolymer has an A-B-A type tri-block copolymer structure wherein
  the block A contains, as a component, an α,β-unsaturated carboxylic acid having 3 to 8 carbon atoms, of which at least a part of carboxyl groups is neutralized with a metal ion, and
  the block B is a polyolefin block containing, as a component, at least one olefin selected from the group consisting of ethylene, propylene, butene, and pentene, and
  wherein the golf ball is a multi-piece golf ball having a core, two or more intermediate layers covering the core, and a cover covering the intermediate layers, wherein the constituent member containing the golf ball material is an outer most intermediate layer and the constituent member containing the polyurethane is the cover.

12. The golf ball according to claim 11, wherein a degree of neutralization of the carboxyl groups of the block A is 10 mole % or more, and the golf ball material has a slab hardness in a range from 35 to 70 in Shore D hardness.

13. The golf ball according to claim 11, wherein an adhesive layer is further interposed between the constituent member containing the golf ball material and the constituent member containing the polyurethane.

* * * * *